United States Patent [19]
Funari

[11] 4,189,747
[45] Feb. 19, 1980

[54] INFRARED TRACKING SYSTEM
[75] Inventor: Anthony V. Funari, Los Angeles, Calif.
[73] Assignee: Hughes Aircraft Company, Culver City, Calif.
[21] Appl. No.: 667,979
[22] Filed: Sep. 15, 1967
[51] Int. Cl.² ................ H04N 7/18; G01J 1/00; H04N 5/33
[52] U.S. Cl. ............... 358/126; 250/203 CT; 250/342; 358/113; 358/125
[58] Field of Search ............ 178/6.8; 250/203 C, 250/203 RT, 83.3 IR, 203 CT, 203 R, 342; 343/61 R; 358/125, 126, 113

[56] References Cited
U.S. PATENT DOCUMENTS

| | | | |
|---|---|---|---|
| 3,736,376 | 5/1973 | Kato, Jr. | 358/126 |
| 3,923,273 | 12/1975 | Alpers | 358/125 |
| 3,950,611 | 4/1976 | Callis et al. | 358/126 |

*Primary Examiner*—S. C. Buczinski
*Attorney, Agent, or Firm*—Lawrence V. Link, Jr.; W. H. MacAllister

[57] ABSTRACT

A tracking system for automatically tracking a designated target in response to video signals provided by a scanning infrared imaging sensor. A gated tracker provides output signals which are proportional to the angular deviation between the target's line of sight and the sensor's optical axis. Tracking gates are manually or automatically adaptable to the target image size so as to provide increased tracking stability and accuracy. Means are further provided for sensing when the target's image is larger than the tracking gates and for automatically expanding the tracking gates to compensate therefor. The gated tracker further comprises normalization means for providing tracker response substantially independent of target image size.

18 Claims, 11 Drawing Figures

INFRARED TRACKING SYSTEM

BACKGROUND OF THE INVENTION

This invention relates to tracking systems and particularly to novel and improved infrared video tracking systems that provide accurate and stable tracking of high speed targets of varying image sizes.

Some prior art infrared tracking systems employed manual target tracking by means of a hand control or a light pencil, while other trackers incorporated automatic target tracking with fixed size tracking gates. The systems utilizing manual tracking are limited by the operator's response and require an uneconomic application of the operator's time. The fixed gate size prior art tracking systems have encountered accuracy and stability problems when tracking targets of varied image size.

SUMMARY OF THE INVENTION

Briefly the infrared tracking system in accordance with the invention comprises an array of detector elements that sense the thermal radiation characteristics of the energy received thereby. The sensor or detector array is scanned mechanically and electronically in interlaced fields and provide video signals representative of the thermal radiation pattern of objects within the field of view of the scanned raster. The video signals are displayed on a screen such as a cathode ray tube in association with signals indicative of the position and size of tracking gates. A video processor discriminates between a designated target signal and background noise signals by sensing the difference in the amplitude level of the target signals within the tracking gates from the average amplitude of signals in background gates. The video processor generates digital signals the time duration of which are indicative of the target image area. The target digital signals are processed in four pairs of tracking integrators to derive position signals representative of the target's position within the sensor's field of view. The digital target signals are also processed by a target size integrator that develops a signal proportional to the selected target's area. The target's area signal is utilized to control the gain of the tracking integrator so as to improve the system's stability for varying size target images. Means are further provided for manually or automatically controlling the size of the tracking gates and in the latter state for automatically expanding the tracking gate size when the target's image is larger than the gate size.

Therefore, it is an object of the present invention to provide an adaptive gated tracking system with improved accuracy and stability.

Another object of this invention is to provide a tracking system with tracking gates that are manually and automatically adaptable to varying image sizes.

A further object of this invention is to provide a tracking system which senses when the target image is larger than the tracking gate and which automatically expands the tracking gates to compensate therefore.

Another object of this invention is to provide a closed loop infrared tracking system which enables the tracker to maintain tracking anywhere within the field of view, should the target position with respect to the boresight axis of the sensor be changing at such a rate that the gimbals are not able to maintain the line of sight to the target coincidence with the boresight axis.

Still another object of the subject invention is to provide a novel and improved infrared tracking system that incorporates an array of detection elements that may be scanned electronically and mechanically in a raster of interlaced fields.

BRIEF DESCRIPTION OF THE DRAWINGS

The novel features which are believed to be characteristic of the invention both as to its organization and method of operation together with further objects and advantages thereof will be better understood from the following description considered in connection with the accompanying drawings in which like characters refer to like parts and in which.

DESCRIPTION OF THE PREFERRED EMBODIMENT

Figure 1:
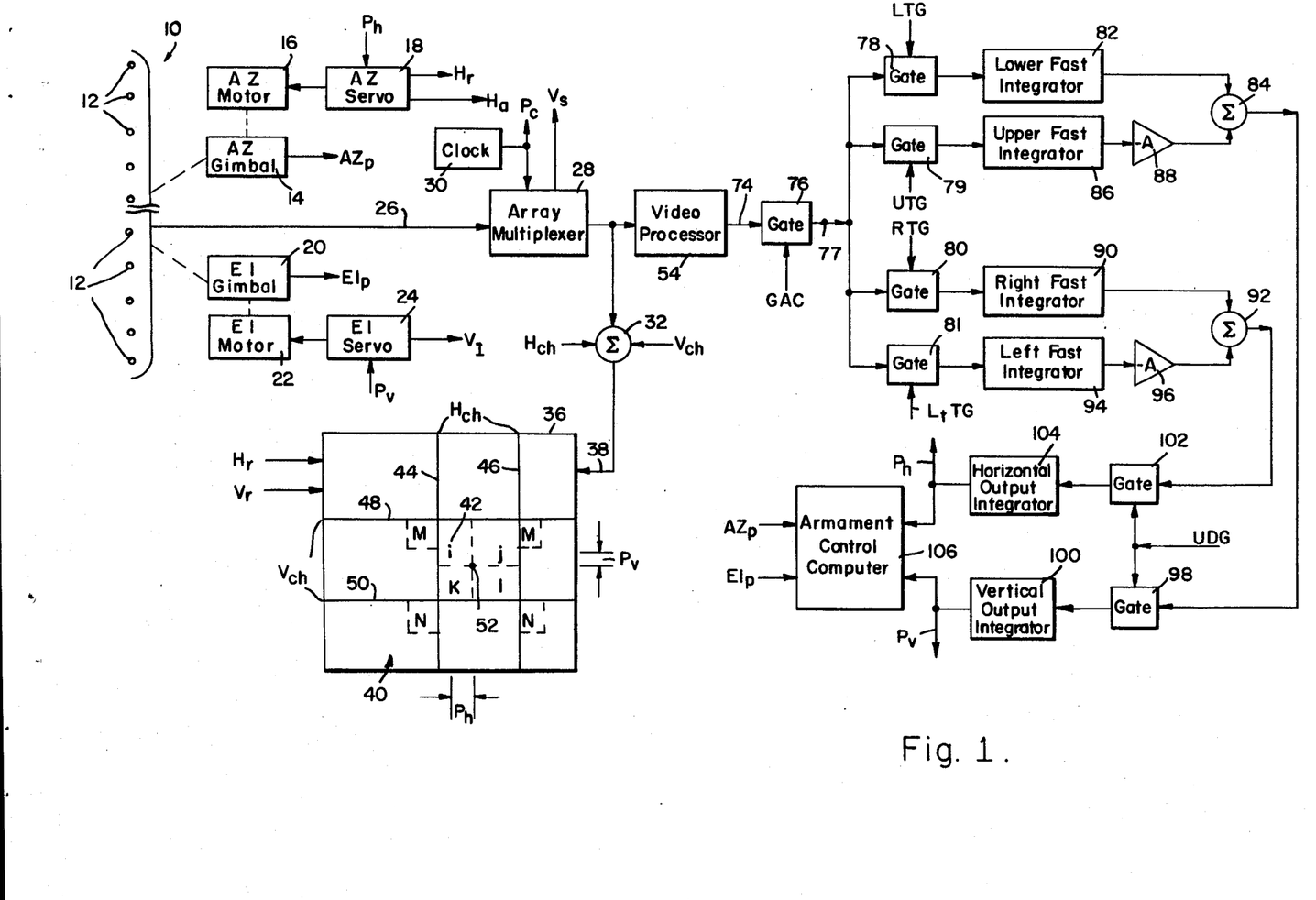
FIG. 1 is a block diagram of the array scanning, video processing, display and tracker portions of the system in accordance with the principles of the subject invention.
Figure 2:
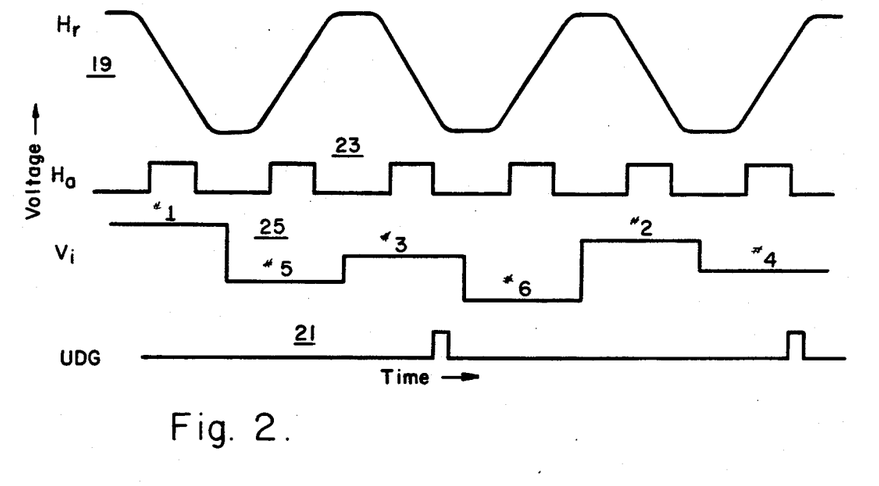
FIGS. 2, 3 and 7 are schematic diagrams of voltages versus time waveforms for explaining the operation of the system in accordance with the principles of the subject invention.

Referring first to FIG. 1, an infrared imaging sensor, or detector array, 10 consists of an array of elements 12 that sense the thermal radiation characteristics of infrared energy received thereby. The sensor or detector array 10 is mechanically scanned about an azimuth gimbal 14 in the horizontal plane by an azimuth motor 16. As is well-known in the art, the azimuth motor 16 may be controlled by an azimuth servo control unit 18 which generates an analog output signal $H_r$ (waveform 19 of FIG. 2) that is indicative of the instantaneous horizontal position of the sensor. The azimuth servo unit 18 also generates a square-wave signal $H_a$, shown by waveform 23 of FIG. 2, which signal is at a high level voltage state during the time period that the detector array 10 is in the central portion of an azimuth scan sweep. The elements 12 of array 10 may be positioned with (n-l) spaces between the elements to minimize the complexity of the array and the elevation scan of the detector array 10 is interlaced by n to improve resolution. The detector array 10 is driven in an interlaced elevation scan pattern about an elevation gimbal 20 by an elevation motor 22. A conventional elevation servo unit 24 controls the elevation motor 22 and the elevation servo unit 24 further provides an output signal $V_i$ which is an analog representation of the position of the array 12 in the elevation plane (waveform 25, FIG. 2). For example, if the elements 12 of the detector array 10 are positioned such that there are five empty positions therebetween, the array would sweep a complete elevation dimension of the raster by a six to one interlace of the raster which would comprise six interlace fields. The horizontal array scan could occur at a forty-five cycle per second rate for example and the antenna could sweep from left to right on three interlace fields and from right to left on the other three fields.

Figure 3:
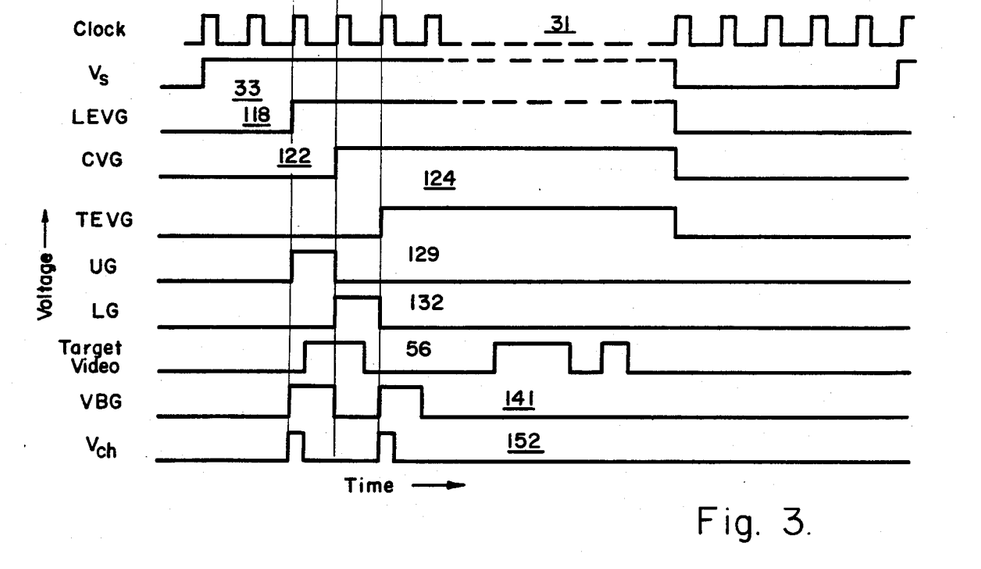

The output terminals of each of the detector elements 12 are coupled on a composite lead 26 to an array multiplexer 28. The array multiplexer, as is well-known in the art, may be comprised of counters and ring counters which sequentially sample the output of each of the detector elements during a given time period to provide in effect an electronic scan in the vertical dimension. The array multiplexer 28 may be synchronized by clock 30 and the clock signals (waveform 31 of FIG. 3) counted down to provide vertical sync signals $V_s$ (waveform 33 of FIG. 3) which indicate the start of one readout sequence of the vertical array. For example, the multiplexer rate could be counted down from an 18.75 megacycles per second clock rate to a 6.25 megacycles per second rate and the vertical synchronization ($V_s$-retrace) rate would occur at 150 kilocycles per second. It is noted that the timing values selected for this embodiment are only typical values for a given tracker application and that other time bases may be utilized in accordance with the subject invention.

Since the array multiplexer 28 sequentially samples the detector elements 12 at a high rate, as the sensor array is horizontally scanned in the horizontal dimension and interlaced in the elevation dimension, the video output signal from the array multiplexer 28 is representative of the infrared energy distribution received during the raster scan period.

The received video signals from the output circuit of the array multiplexer 28 are applied to a summation circuit 32 and therein summed with a signal $V_{ch}$ and a signal $H_{ch}$. The signal $V_{ch}$ is composed of a series of pulses that are indicative of the relative time of occurrence of a pair of vertical crosshairs and the signal $H_{ch}$ is comprised of a series of pulses that are indicative of the time of occurrence of a pair of horizontal crosshairs. The circuits for mechanization of signals $H_{ch}$ and $V_{ch}$ will be explained in detail subsequently, but for now it may be assumed that the relative position or timing of these signals are such as to present intensified lines on a display screen 40 of a display monitor 36. The area formed by intersection of the just mentioned crosshairs on the display screen 40 indicates the position of the scanned raster in which targets will be tracked by the system of the subject invention. The combined received video signals and crosshair signals are applied from the summation circuit 32 to a video input terminal 38 of the display monitor 36. The horizontal deflection circuits of the display monitor 36 are controlled in response to the horizontal position signal, $H_r$, which is applied from the azimuth servo 18 and the vertical deflection circuit response to a vertical position signal $V_r$, the mechanization for which will be explained subsequently.

The operation of the subject invention will be better understood by referring to the display screen 40 of the display monitor 36. It may be assumed that the position 42 is the center of the raster being scanned by the detector array 10 and that in response to the video signals applied to the video input terminal 38 of the display monitor 36 the screen 40 pictorially displays the intensity distribution of the infrared energy received by the detector array 10. It may further be assumed that the horizontal crosshair signals are displayed as a pair of intensified lines 44 and 46 and that the vertical crosshair signals are displayed as a pair of intensified lines 48 and 50. The relative position of the area formed by the intersection of the just mentioned pairs of intensified lines is controllable by an operator, during a target designation period, so that the center of the area formed by said intersection may be superimposed upon a desired target image 52. In the interest of clarity, on the display shown in FIG. 1, the target image 52 is presented as a dot, however, it will be understood that in accordance with the principles of the subject invention the image 52 may be of varying size and that one of the objects of the invention is to provide a tracker that may accommodate targets of greatly varying image size. As will be explained subsequently relative to the tracker portion of the system of the subject invention, the area formed by the intersection of the crosshairs is further divided into four sub-areas as indicated on the screen 40 as areas i, j, k and l. Target signals representative of the target image areas within each of the just mentioned sub-areas are compared by the system of the subject invention so as to determine the center of the target image area to automatically position the center of tracking gates in coincidence therewith. For example, the target image signals in areas i and j are combined and compared against the target image signals in areas k and l and the difference therebetween accumulated and used to update the position of the tracking gates in the vertical dimension. A signal $P_v$, which is representative of the position of the center of the tracking gate and therefore the center of the target from the vertical center of the raster 42, is also generated by the tracker portion of the subject system. In a similar manner, the target image signals in sub-areas i and k are combined and compared against target image signals in sub-areas j and k and the difference therebetween is utilized to update the horizontal position of the tracking gates and to develop a signal $P_h$ which is representative of the position of the center of the target 52 relative to the central position of the raster in the horizontal dimension. Also in accordance with the system of the subject invention, target signals are distinguished from background and noise signals by a comparison technique that samples the received video from positions outside of the tracking gates and uses this sampled video value as a reference to sense changes therefrom within the tracking gates which are indicative of the occurrence of the target video. For example, the received video from an area to the left and right of the upper portion of the tracking gate (designated area m on screen 40 of FIG. 1) as well as the received video to the left and right lower portion of the tracking gate (designated area N) could be sampled and used as a reference for target signal discrimination.

Figure 4:
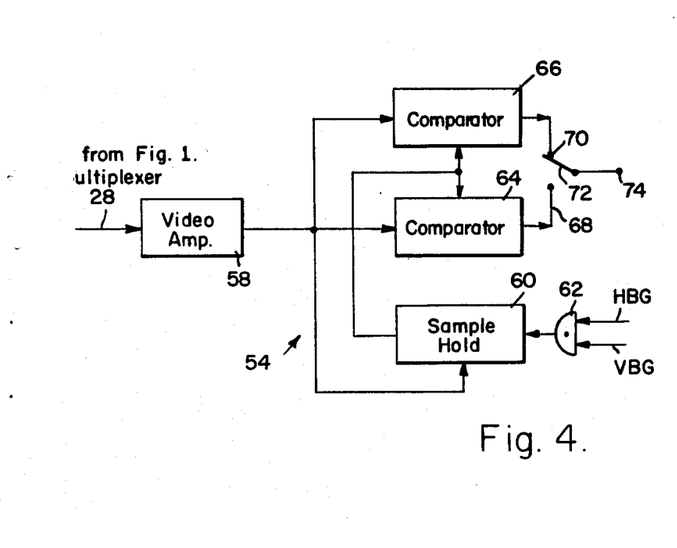
FIG. 4 is a block diagram of a video processor unit that may be utilized in the tracking system of the subject invention.

The received video signals generated in the array multiplexer 28 (FIG. 1) are also applied to an input circuit of a video processor 54. The video processor 54 generates digital target output signals, during the time of occurrence of the received video signals, that are indicative of a selected target as shown by a waveform 56 of FIG. 3. The operation of the video processor 54 will be better understood by reference to FIG. 4 which shows the processor in greater detail. Referring now principally to FIG. 4 the received video after being amplified in a conventional video amplifier 58 is applied to a signal input circuit of a sample and hold circuit 60. Horizontal background gates (HBG) and vertical background gates (VBG) are combined in an AND gate 62 and are then applied to a gate input circuit of the sample and hold circuit 60. The just mentioned background gates have a time of occurrence corresponding to areas of the raster designated by the letters m and n on the screen 40 of the display monitor 36. The circuitry for the mechanization of the background gates will be explained in greater detail subsequently. During the time of occurrence of the signal at the output circuit of the AND gate 62, the sample and hold circuit 60 samples and averages the value of the received video that occurs during the background gating period. The value of the sampled video voltage is held by the sample and hold circuit and applied as reference voltages to a pair of comparators 64 and 66. The amplified received video from the video amplifier 58 is applied to signal input terminals of the aforementioned comparators. The output signal from the comparator 66 is at a high level voltage stage, which may be assumed to be a positive voltage level, during the period that the input received video is greater than the reference value applied from the sample and hold circuit 60. The output signal from the comparator 66 is at a low level voltage state (which may be assumed to be zero or ground potential) during the time period that the amplified received video is less than the reference potential. The comparator 64 provides an output signal at an output terminal 68 that is at the high level state during the time period that the amplified received video is less than the reference potential applied thereto and the output signal is at the low level voltage state during the time period that the amplified received video is greater than the reference potential. An output terminal 70, of the comparator 66, is connected to one terminal of a switch 72 and the output terminal 68 of the comparator 64 is coupled to a second terminal of the switch 72. A wiper terminal of the switch 72 is coupled to an output terminal 74 of the video processor 54 of FIG. 1. The position selected for switch 72 determines whether the digital signal at the output terminal 74 is indicative of targets that are hotter than or colder than the background signals sampled during the background gate time interval.

Referring again to FIG. 1, the output digital signals at the terminal 74 are applied to the gating terminal of a conventional electronic gate 76 and a gate area current (GAC) is applied to the signal input terminal of the gate. The function and mechanization of the circuit that provide the gate area's current will be explained subsequently, but for the present may be assumed that the gate area current is a current signal that decreases inversely proportional to the square root of the area of the tracking gates. The gate area current, at the output terminal 77 of the gate 76, is applied in parallel to the signal input circuits of gates 78 through 81 during the time that digital target signals are applied from the terminal 74. The signals at the output terminal 77 of the gate 76 have a time duration that is representative of the portions of target image areas which are encompassed by the tracking gates and have a magnitude that is a function of the square root of the area of the tracking gates.

The output current is transmitted from the gate 76 through the gates 78 through 81 in response to tracking gating signals applied thereto. The target signals, corresponding to the area of the raster contained in sub-areas k and l on the screen 40, of the display monitor 36, are transmitted through the gate 78 in response to a lower tracking gate (LTG) signal applied thereto. The gated output current from gate 78 is integrated in a lower fast integrator 82 which has an output terminal coupled to a summation circuit 84. In a similar manner, the target signals corresponding to sub-areas i and j, on the raster displayed on a screen 40, are transmitted through the gate 79 in response to an upper tracking gate (UTG) signal and then applied to an upper fast integrator 86. The output signal from the integrator 86 is inverted in polarity in a conventional amplifier 88, and then applied to the summation circuit 84. Similarly the target signals corresponding to raster sub-areas j and l are gated through the gate 80 in response to a right tracking gate (RTG) applied thereto. The output signal of the gate 80 is integrated in a right fast integrator 90 which has an output terminal coupled to a summation circuit 92. The target signals corresponding to sub-areas i and k are transmitted through the gate 81 in response to a left tracking gate ($L_tTG$). The output current from the gate 81 is integrated in a left fast integrator 94, reversed in polarity in a conventional amplifier 96 and then applied to a second input terminal of the summation circuit 92. The output signal from the summation circuit 84, which is a function of the difference in target signals processed from the sub-areas above and below a reference point (indicated by $P_v$ on the screen 40) is applied to a conventional gate 98. The gate 98 is controlled by an update gate signal (UDG) and in response to this signal the gate 98 discharges the output signal of the summation circuit 84 into a vertical output integrator 100. The mechanization of the update gate signal will be explained in detail subsequently, but for the present it may be assumed that this signal occurs after sufficient fields have been scanned so that the data signal at the output terminal of the summation circuit 84 is a reliable indication of the deviation of the center of the tracking gates from the center of the target's image. In an identical manner, the signal at the output terminal of the summation circuit 92 is gated through a gate 102 in response to the update gate signal and the output signal therefrom is integrated in a horizontal output integrator 104. The signal $P_v$, which is an analog representation of the vertical position of the center of the target relative to the center of the raster scanned by the sensor 10, is applied to an armament control computer 106. Also, the output signal from the horizontal position of the target relative to the center of the scanned raster, is applied to the armament control computer 106. The armament control computer also receives a signal $AZ_p$, from the azimuth gimbal 14, which is an analog representation of the position of the scanned raster in the horizontal dimension relative to an armament reference line of the vehicle upon which the system of the subject invention is mounted. Further, the armament control computer receives a signal $EL_p$ from an output circuit of the elevation gimbal 20, which is an analog representation of the position of the elevation gimbal relative to the armament reference line of the vehicle upon which the system is mounted. The signals $AZ_p$ and $EL_p$ may be provided by conventional pickoffs mounted on the gimbals, as is well-known in the art. For example, they may be furnished by synchro pickoffs or by linear resolvers. In response to the signals $P_h$, $P_v$, $AZ_p$ and $EL_p$, the armament control computer, as is well-known in the art, computes the line of sight position and the line of sight rate of the designated target relative to the armament reference line and provides control signals to a weapon launch system (not shown).

Figure 5:
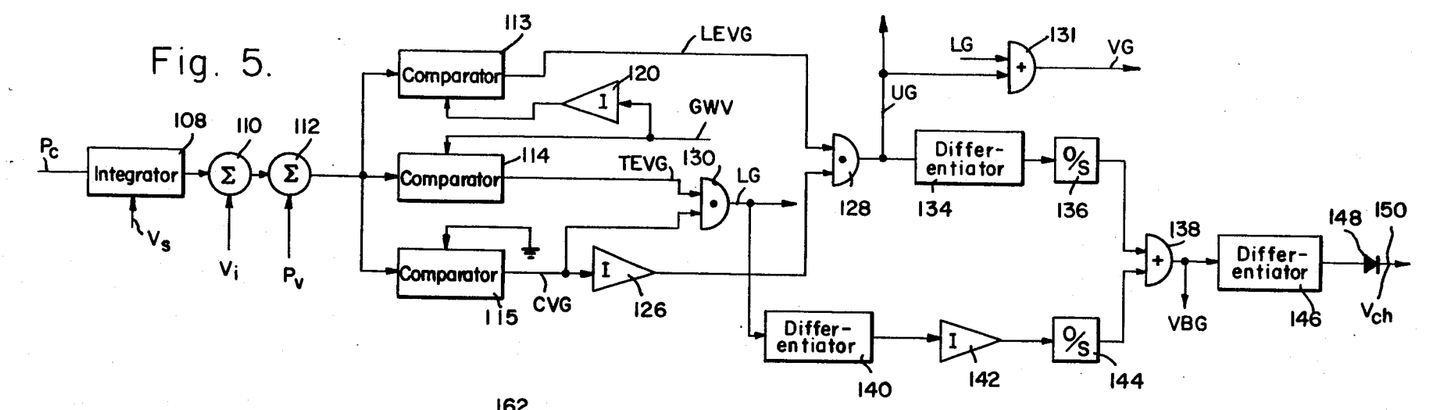
FIGS. 5, 6 and 7A are block diagrams of gate signal generating circuits which may be utilized in the tracking system of the subject invention.

Referring now principally to FIG. 5, the circuitry for mechanization of the gating signals that control the gates for the fast integrators of FIG. 1 will now be explained. The clock signals, $P_c$, are applied from the clock 30 of FIG. 1 to an input terminal of an integrator 108, FIG. 5. The clock signals develop a staircase type signal in the integrator 108 which is reset to a reference potential level in response to the vertical sync signal ($V_s$) applied from the sync output circuit of array multiplexer 28 (FIG. 1). The instantaneous voltage of the staircase signal, at an output terminal of the integrator 108, is representative of the relative position of the array elements 12 sampled by the array multiplexer 28 and thus are a partial representation of the elevation position of the video beam readout by the array multiplexer 28. The interlace signal from the output terminal of the elevation servo 24 (FIG. 1) is summed with the staircase output voltage of integrator 108 in a summation circuit 110. The summation of the interlace signal with the staircase voltage produces six different level staircase signals which permit the tracker to operate on any one of the vertical interlace positions and not just on the same interlace field each frame. The point on the staircase which represents the center of the vertical gate is referenced to ground by summing the staircase with the vertical gate position signal $P_y$ in a summation circuit 112. The output signal from the summation circuit 112 is applied in parallel to the signal input terminals of three comparators 113 through 115. Comparator 114 has a gate width voltage signal applied to a reference terminal thereof and the output signal therefrom assumes a predetermined high level voltage state during the time period that the input signal is greater in magnitude than the reference signal. The gate width voltage signal will be explained in greater detail subsequently but for now it will be sufficient to note that this signal determines the time duration or the size of the tracking gates and in accordance with the principles of the subject invention varies as a function of the target image size. The gate width control voltage, is also applied through a conventional inverter amplifier 120 to a referenced input terminal of the comparator 113. It will be recalled that a portion of the stairstep signal at the output terminal of the summation circuit 112 had been referenced to ground by summing the output signal of the summation circuit 110 and the vertical position signal $P_y$. The signal at the output of the summation circuit 112 is applied to a signal input terminal of the comparator 113 which is referenced to the gate width voltage after phase inversion through the inverter 120. The signal at the output terminal of the comparator 113 will be at a high level voltage state during the time period that the input signal applied thereto has a greater amplitude than the referenced signal. The output signal of the comparator 113 which is designated the leading edge of the vertical gate (LEVG) is shown by a waveform 118 of FIG. 3. Also the signal at the output terminal of the summation circuit 112 is applied to a signal input terminal of a comparator 115 that has a fixed reference voltage applied to the comparator reference circuit. For example, ground potential could be applied to the reference terminal of the comparator 115 so that when the input signal exceeds the reference or ground potential the output signal of comparator 115 switches to the high-level voltage state. The output signal from the comparator 115 is designated center of vertical gate (CVG) and is shown by a waveform 122 of FIG. 3. The output signal from the summation circuit 112 is also applied to a signal input terminal of a comparator 114 which has the gate width voltage applied to the reference circuit thereof and the output signal of the comparator 114 assumes the high voltage level state during the time period that the input signal thereto has a greater amplitude than the gate width voltage signal. The output signal of comparator, 114, which is designated trailing edge of the vertical gate (TEVG), is shown by a waveform 124 of FIG. 3. The output signal of the comparator 115 is inverted in polarity in the inverter amplifier 126, the output terminal of which is coupled to a first input terminal of an AND gate 128. A second input terminal of the AND gate 128 is coupled to the output terminal of the comparator 113. The output signal of the AND gate 128 is shown by waveform 129 of FIG. 3 and is designated the upper gate (UG). As may be seen from FIG. 3, the upper gate is at the high level state during the time period between the leading edge of the vertical gate and the center of the vertical gate. The output circuit of the comparator 115 is also coupled to a first input terminal of an AND gate 130. A second input terminal of the AND gate 130 is coupled to the output circuit of the comparator 114 and the output signal therefrom is designated the lower gate (LG) and is shown by a waveform 132 of FIG. 3. As may be noted from FIG. 3, the lower gate signal is at the high level voltage state during the time period between the occurrence of the leading edge of the center gate signal and the trailing edge of gate signal. The upper (UG) and lower (LG) gate signals are applied to the input terminals of an OR gate 131. The output signal from the OR gate 131, designated vertical gate (VG), is at the high level voltage state during both the upper and lower vertical gating periods. The upper gate signal at the output of the AND gate 128 is differentiated in a conventional differentiator circuit 134, and the positive output signals therefrom trigger a monostable multivibrator 136, commonly referred to as a one-shot (o/s). In response to the trigger pulses applied thereto, the one-shot circuit 136 produces digital signals of a constant pulse width and the output circuit of the one-shot 136 is coupled to a first input terminal of an OR gate 138. The signal at the output terminal of the AND gate 130 (LG) is applied to an input circuit of a conventional differentiator 140. The output signals from the differentiator 140 are applied through an inverter 142 and then to the trigger input circuit of a monostable or one-shot (O/S) multivibrator 144. A second input terminal of the OR gate 138 is coupled to the output circuit of the one-shot circuit 144. The output signal of the OR gate 138, which is designated vertical background gate (VBG), is shown by waveform 141 of FIG. 3 as a pair of digital pulses of constant pulse duration. The first one of the vertical background gate pulses occurs at the time of occurrence of the leading edge of the vertical gate and the second one of said pulses commences at the time of occurrence of the trailing edge of the vertical gate. The vertical background gate signals, at the output terminal of the OR gate 138, are differentiated in a conventional differentiator 146 and the positive portions of the signal from the differentiator 146 are transmitted through a diode 148 to an output terminal 150. The ouput signal at the terminal 150 is composed of a pair of vertical crosshair pulses as shown by the waveform 152 of FIG. 3. The first pulse of said pair being coincident with the beginning of the leading edge of the vertical gate and the second pulse of said pair being coincident with the trailing edge of the vertical gate.

The horizontal gate signals, which are produced in a manner similar to that just described for the vertical gating signals will now be explained with reference directed to FIG. 6. The truncated sine wave signal, $H_r$, which is an analog representation of the horizontal position of the detector array 10, is applied to a first input terminal of a summation circuit 160 from the AZ servo 18 (FIG. 1). A point on the truncated sine wave is referenced to ground in the summation circuit 160 by summation therein with the signal $P_h$. The output signal from the summation circuit 160 is applied in parallel to a group of four comparators 162 through 165 inclusively. The comparator 162 has the gate width voltage (GWV) signal, after it has been inverted in polarity in an inverting amplifier 166, applied to a reference terminal thereof. The output signal of the comparator 162, which is designated left edge of horizontal gate (LEHG), is at the high voltage level state during the time period that the input signal thereto is greater in amplitude than the reference signal applied to the comparator 162. The signal, left edge of the horizontal gate, is shown by a waveform 168 of FIG. 7. The comparator 164 has a fixed reference signal, for example ground potential, applied thereto and its output signal designated center of the horizontal gate (CHG) is shown by waveform 170 of FIG. 7. The center of the horizontal gate signal is at the high level voltage state during the time period that the input signal from the summation circuit 160 is greater in amplitude than the reference or ground potential. The comparator 163 has the gate width voltage applied to the reference terminal thereof, and the output signal of the comparator 163, designated right edge of the horizontal gate (REHG), is shown by a waveform 172 of FIG. 7. The right edge of the horizontal gate signal is at the high level voltage state during the time period that the input signal to the comparator 163 is of a greater amplitude than the reference signal applied thereto. The center of the horizontal gate signal is inversed in polarity in an inverter amplifier 173 and combined with the left edge of the horizontal gate in an AND gate 174 to form an output pulse that is at the high level state during the time period commencing with the occurrence of the left edge of the horizontal gate and terminating with the occurrence of the center of the horizontal gate. The output signal of the AND gate 174, which is designated left gate ($L_{tG}$) is shown by waveform 176 of FIG. 7. In a similar manner the signal right edge of the horizontal gate and the signal center of the horizontal gate are combined in an AND gate 178 to produce a signal right gate (RG) which is shown by a waveform 179 of FIG. 7. The left ($L_{tG}$) and right (RG) gating signals are applied to the input terminals of an OR gate 175. The output signal from the OR gate 175, designated horizontal gate (HG), is at the high level voltage state during both the left and right gating periods. A fixed predetermined negative voltage, applied by voltage supply 180, is summed with the gate width voltage in a summation circuit 182 and the output signal therefrom is applied to the reference terminal of the comparator 165. The signal input circuit of the comparator 165 is also coupled to the output circuit of the summation circuit 160. The signal at output terminal of comparator 165 switches to the high level state when the input signal thereto is of a greater amplitude than the reference signal applied from the summation circuit 182. Due to the summation of the voltage at the output terminal of the voltage supply 180, the signal at the output terminal of the comparator 165 will switch to the high level state a predetermined time period prior to the occurrence of the signal at the output terminal of the comparator 162. Therefore comparator 165 provides a signal that precedes the left edge of the horizontal gate. The output terminal of the comparator 165 is coupled to a conventional differentiator circuit 184 which provides a positive signal coincident with the leading edge of the input signal applied thereto. The output signal of the differentiator 184 is applied to a trigger circuit of the one-shot circuit 186 which in response thereto generates a constant width pulse the leading edge of which is coincident with the leading edge of the signal at the output of comparator 165. The output signal of the comparator 163 (right edge of horizontal gate) is differentiated in a differentiator 188 and the output signal from the differentiator 188 triggers a one-shot circuit 190. The pulses provided by the one-shot circuits 186 and 190 are combined in an AND gate 192 to generate the horizontal background gates (HBG) shown by a waveform 194 of FIG. 7. It will be noted from FIG. 7 that the horizontal background gates are a pair of constant time duration pulses with the first pulse preceding the left horizontal gate and the second pulse occurring subsequent to the occurrence of the right horizontal gate. The horizontal background gate signal is differentiated by a differentiator 196 and the negative pulses at the output terminal thereof are transmitted by the diode 198 to an inverter amplifier 199 and then applied to an output terminal 200. Signals at the output terminal 200 are designated horizontal crosshairs ($H_{ch}$) and are shown by waveform 197 of FIG. 7. The horizontal crosshair signals are narrow pulses that coincide with the leading edge of the left horizontal gate and the trailing edge of the right horizontal gate and these signals. As was described previously, the horizontal crosshair signals are applied through the summation circuit 32 (FIG. 1) to the display monitor 36 to write thereon the narrow white lines representative of the horizontal position of the target gates.

Figure 6:
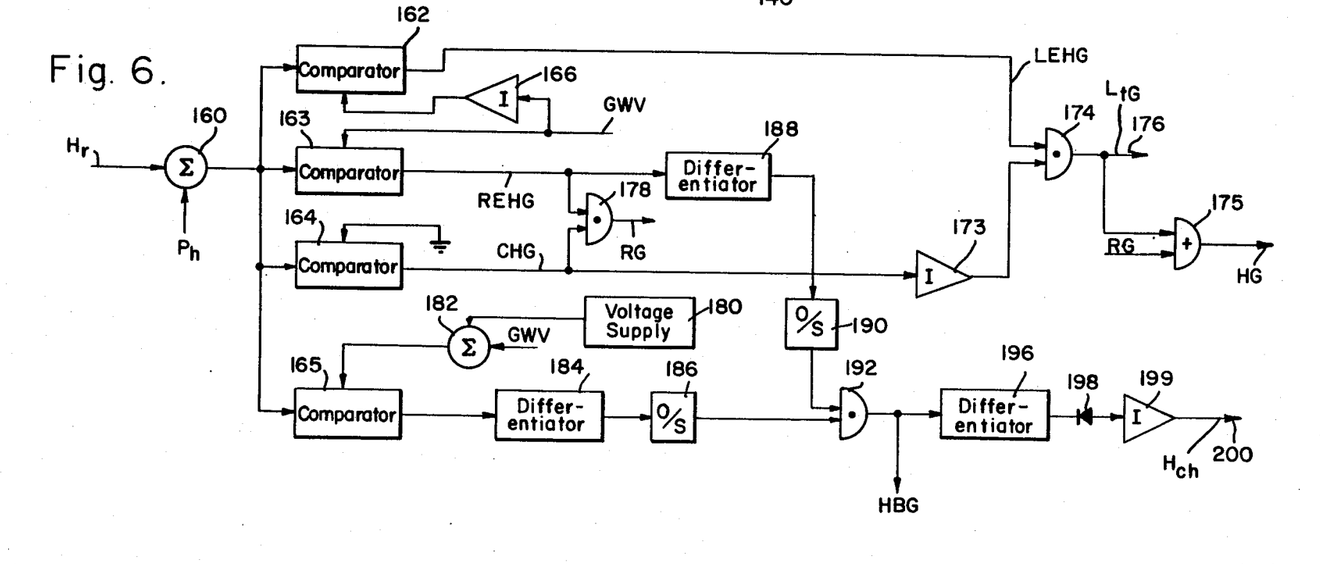
Figure 7:
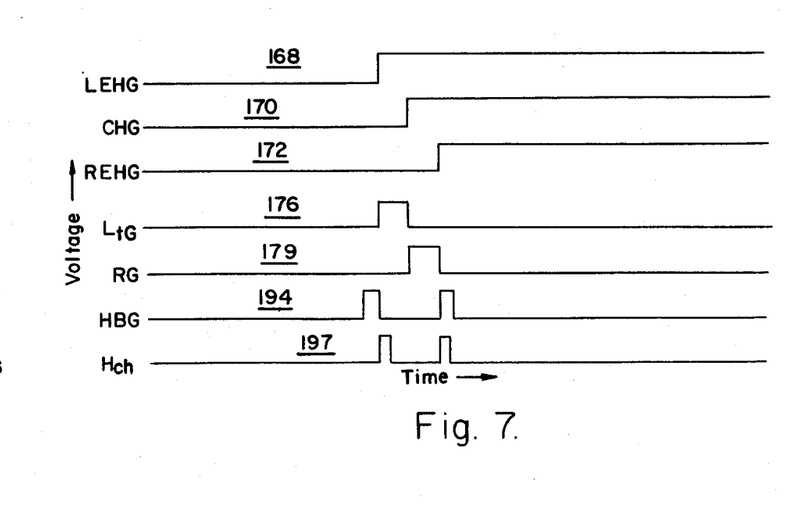
Figure 7A:
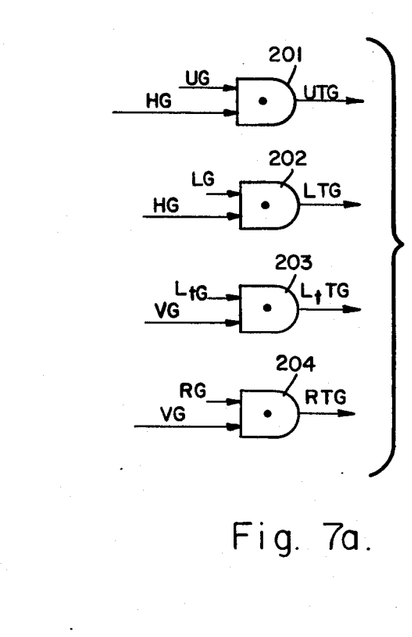

The upper tracking gate (UTG), the lower tracking gate (LTG), the left tracking gate ($L_{tG}$), and the right tracking gate ($R_{tG}$) are produced in AND gates 201 through 204 inclusively of FIG. 7a by cross ANDing the upper, lower, right and left gates of FIGS. 5 and 6 with the vertical gate (output of OR gate 131) and horizontal gate (output of OR gate 175). The function of the signals generated in the AND gates of FIG. 7a is to provide tracking gates for controlling the gates 78 through 81 of FIG. 1. It should be noted that the tracking gate signals occur exclusively during the sub-areas i, j, k and l, shown on screen 40 of FIG. 1, of the scanned raster.

Figure 8:
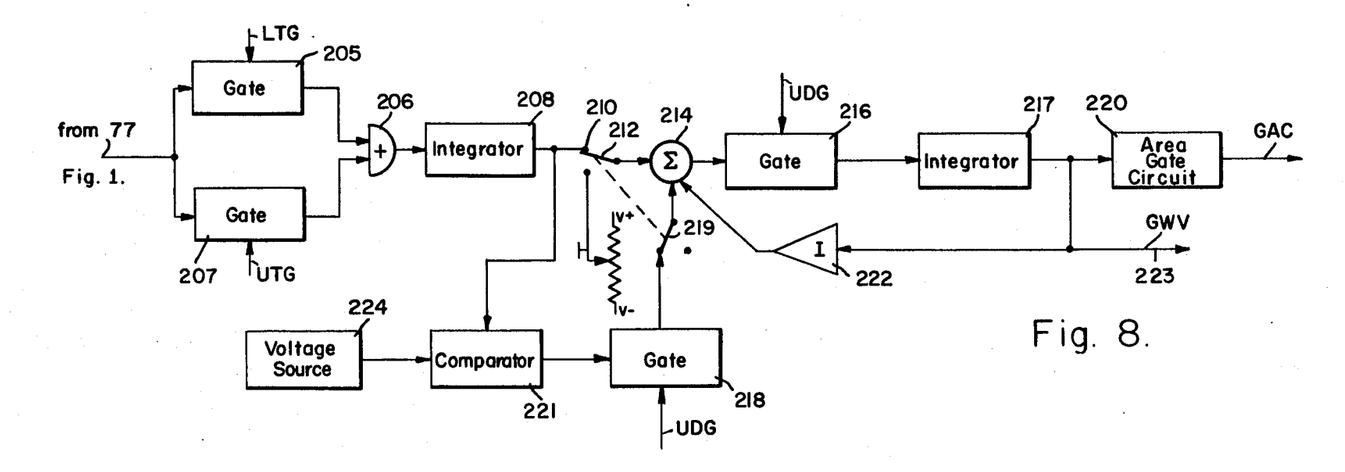
FIG. 8 is a block diagram of a control circuit for generating signals which are utilized to automatically control the width of the tracking gates and the gain of the output integrators of the tracker portion of the system of the subject invention.

The circuits for the mechanization of the gated area current and gate width voltage signals will now be explained in detail with reference to FIG. 8. The digital target signals at the output terminal 77 of the gate 76 (FIG. 1) are applied in parallel to a pair of gate circuits 207 and 205. The gate 207 is activated by the upper tracking gate and the gate 205 by the lower tracking gate. The output signal of gates 207 and 205 are combined in an OR gate 206 the output of which is coupled to an integrator 208. The voltage at the output terminal of the integrator 208, which is proportional to the square root of the image area of the designated target, is applied through a terminal 210 of a switch 212 to a first input terminal of a summation network or circuit 214. An output circuit of the summation network 214 is coupled to a signal input terminal of a gate 216 which, in response to the update gating signal, transmits the signal to the input circuit of an integrator 217 and discharges the integrator 208. The gate width voltage (GWV) signal at the output terminal 223 of the integrator 217 is proportional to the width of the tracking gates. The gate width voltage is processed by an area gate circuit 220 in such a manner that the output gated area current (GAC) therefrom is an inverse function of the gate width voltage applied thereto. Circuits that provide an output current proportional to the inverse of an input voltage signal are well-known in the art, and may be accomplished by a shaping network consisting of a plurality of diodes connected to different appropriate voltages in the emitter of a transistor whose base is connected to the previously mentioned input voltage signal. The output signal from the integrator 217 is also applied through a conventional inverting amplifier 222 to a second input circuit of the summation network 214 in a conventional feedback arrangement. A third input signal to the summation network 214 is coupled through a switch 219 from a gate 218 which is controlled by the update gating signal (UDG) applied thereto. The input signal terminal of a comparator 221 is coupled to the output circuit of the integrator 208 and a reference circuit of the comparator is connected to a fixed voltage source 224. The comparator 221 senses when the voltage level at the output of the integrator 208, which indicates target size, is less than the voltage supplied from the source 224 and then gates in the voltage from the output of the comparator 221 thereby enlarging the tracking gate size.

Figure 9:
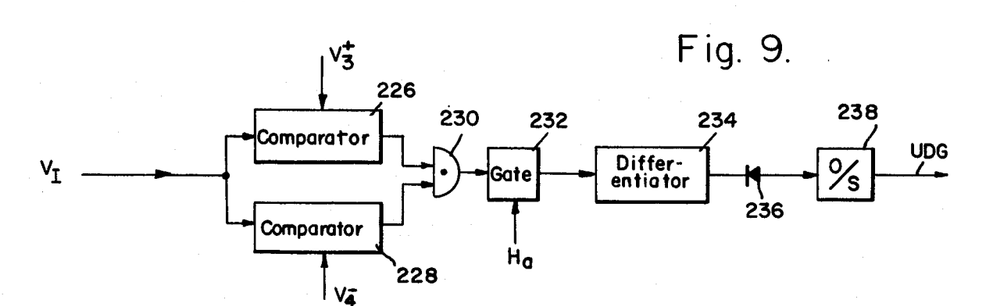
FIG. 9 is a block diagram of an update gate generator circuit which may be utilized in the system of the subject invention.

The circuits for generating the update gating signal will now be described with reference directed principally to FIG. 9. The signal $V_I$, which is an analog representation of the elevation interlace scan pattern of the sensor or detector array 10 (waveform 25, FIG. 2), is applied in parallel to a pair of comparators 226 and 228. A fixed voltage signal $V_3^+$ is applied as a reference signal to the comparator 226 and a fixed voltage signal $V_4^-$ is applied as a reference to the comparator 228. The signal $V_3^+$ is selected to be slightly more positive than the interlace voltage signal representative of a selected elevation scan interlace level, for example, interlace level 3 of waveform 25 of FIG. 2. The signal $V_4^-$ may be selected to be slightly less positive than a second selected scan interlace level, for example, interlace level 4. The output signal from the comparator 226 will be at the high level voltage state during the time period that the input signal $V_I$ is less positive than the signal $V_3^+$. The output signal from the comparator 228 will be at the high level state during the time period that the signal $V_I$ is greater than the referenced level $V_4^-$. The output circuits of the comparators 226 and 228 are combined in an AND gate 230 and the signal at the output terminal of the AND gate will be at a high level state only during the selected interlace scan periods, for example, interlace periods No. 3 and No. 4 for the just described mechanization. The output signal from the AND gate 230 is transmitted through a gate 232 to the input circuit of a differentiator 234 in response to the enabling signal $H_A$. The negative signals at the output terminal of the differentiator 234 are coincident in time with the termination of the horizontal active period during the interlace scans 3 and 4 (see waveforms 23 and 25 of FIG. 2) and is transmitted through the diode 236 to a trigger input circuit of a one-shot multivibrator 238. The output signal from the one-shot 238 is the update gating signal which controls the updating time periods of the output integrators 100 and 104 (FIG. 1) and which controls the integration timing of gates 216 and 218 (FIG. 8).

Figure 10:
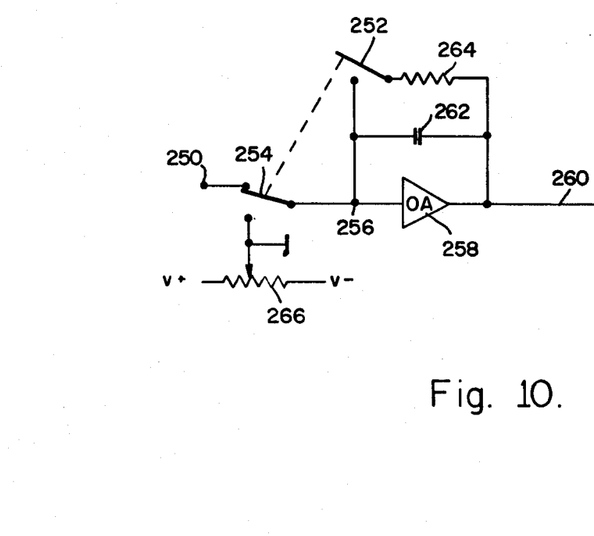
FIG. 10 is a block and schematic diagram of an output integrator that may be utilized in the tracker portion of the system shown in FIG. 1.

The system of the subject invention has two modes of operation, acquisition and track which will be described with reference directed primarily to FIGS. 1 and 10. The integration arrangement of FIG. 10 may be utilized for both output integrators 100 and 104 of FIG. 1, and will be explained relative to integrator 104. In the track mode of operation switches 252 and 254 of FIG. 10 are in the position thereshown. The output signal from gate 102 (FIG. 1) is applied to an input terminal 250 and then transmitted through the switch 254 to an input junction 256 of an operational amplifier 258. The capacitor 262 is coupled between the junction point 256 and an output terminal 260 of the operational amplifier 258 to form a conventional integrator arrangement. The signal at the output terminal 260 therefore is the integral of the input signal applied to the terminal 250. In the acquisition mode of operation the switches 252 and 254 are in the opposite positions from those shown in FIG. 10 and a resistor 264 is shunted across the capacitor 262 and the operational amplifier 258. In the just described switching arrangement the operational amplifier acts as a conventional amplifier and the output signal at the terminal 260 is an amplification of the signal applied to the junction point 256 through the switch 254. In the acquisition mode of operation the signal applied to the terminal 256 is coupled from a wiper terminal of a potentiometer 266. Suitable positive and negative voltages are applied to the terminals of the potentiometer 266 and the wiper position is controllable by the operator. It should be noted that switch 252 and resistor 264 may be deleted and a rate acquisition, rather than position acquisition as just described, is effected. In the operation of the system of the subject invention, the detector array 10 (FIG. 1) scans a sector in space in response to the azimuth servo unit 18 and elevation servo unit 24. The received infrared energy is sequentially readout of the detector elements 12 by the electronic scan arrangement of the array multiplexer 28. The received video signals at the output terminal of the array multiplexer 28 are applied through the summation circuit 32 to the display monitor 36. When the output integrators are switched to the acquisition mode of operation, as explained previously relative to FIG. 10, the acquisition potentiometers, such as potentiometer 266 of FIG. 10, control the voltages $P_h$ and $P_v$ at the output terminals of integrators 104 and 100, respectively. The signals $P_v$ and $P_h$ are applied to the gate generator and crosshair generating circuits of FIGS. 5 and 6 and the vertical crosshair signal ($V_{ch}$) and the horizontal crosshair signal ($H_{ch}$) are applied through the summation circuit 32 (FIG. 1) to the display monitor 36. The operator adjusts the potentiometers, such as 266 of FIG. 10, until the desired target image is within the area formed by the intersection of the crosshairs on the screen 40 of the display monitor 36 at which time the operator switches the output integrators to the track mode of operation. As will be recalled from the previous discussion, in the track mode of operation the signals $P_h$ and $P_v$ are controlled by the updating current transmitted through the gates 102 and 98, respectively. However, prior to the arrival of the first update gate signal to the gates 102 and 98, the previous acquisition value of the signals $P_h$ and $P_v$, that are held by the output integrators, still control the positions of the tracking gate generated in the circuits shown in FIGS. 5, 6 and 7a.

The received video signals that are readout of the array elements through the array multiplexer 28 are processed by the video processor 54, the mechanization of which is shown in FIG. 4. Referring momentarily to FIG. 4, the horizontal background gates and the vertical background gates, which are generated in the circuitry of FIGS. 5 and 6, control the sampling of the received video signals during portions of the array scan outside of the gated tracking area. The sampled signal level is then held and compared against the received video read out of the array multiplexer 28 and digital target signals are generated when the received video is hotter or colder than the sampled background signal depending on the position of the switch 72 (FIG. 4). It should be noted that the horizontal background gates and the vertical background gates have constant pulse width or time durations and therefore their mean sampled value does not have to be compensated for as the tracking gates size varies in response to a change in a target image size. Although the video processor 54 of FIG. 1 utilizes a background reference processing technique, it should be noted that the principles of the invention are not limited to this type of video processor. For example a mean-level processor which determines the mean value of the video within the tracking gates and which generates a signal when the video is hotter or colder than the mean-level. However the time constant of the mean-level detector would have to be compensated for as the target image size changes. Also a target reference processor could be utilized in which the video level of the target is sampled and held and the video is compared to the level of the target. In a target referenced processor operator selection of hot or cold target is eliminated, however, the acquisition procedure becomes more difficult since the sampling gates must be positioned over the target. Also with the target reference processing technique, maximum tracking rates are reduced since the most desirable position within the gate for the sampling time to occur is in the center of the gate and the tracker may lose a target if the target is in the gate but not at the center thereof.

Still referring principally to FIG. 1, the digital target signals at the output terminal 74 of the video processor 54, control the gate 76 which in response thereto applies the gated area current in parallel to the gates 78 through 81. The circuitry for the generation of the gated area current was described previously relative to FIG. 8 and it is important to note that this current decreases inversely proportional to the square root of the tracking gate area and therefore in inverse proportion to the square root of the target image size. Due to the fact that in accordance with the principles of the subject invention the gain of the tracker is compensated for as the target size increases or blooms stability problems that are encountered in prior art trackers are substantially reduced. Signals representative of the target's image area to the left and the right of the position $P_h$ are formed at the output of integrators 94 and 90, respectively, and any difference therebetween is applied from the summation circuit 92 through the gate 102 to update the horizontal output integrator 104 and to correct the value of the output signal $P_h$. In a similar manner, signals representative of the target image area above and below a reference point $P_v$ are formed at the output terminals of integrators 86 and 82 respectively. Any difference between the just stated areas is represented by a signal at the output of summation circuit 84, which signal is transmitted through the gate 98 to update the vertical output integrator 100 and thereby correct the value of $P_v$. In the embodiment described herein a raster (one frame time) is scanned in six interlaced fields and sufficient information may be accumulated for example after three fields to allow the output integrators to be updated and to position the tracking gates to a new position in a reliable fashion. Therefore every three fields, the update gate generating logic circuit of FIG. 9 provides a signal to update the output integrators by actuation of the gates 102 and 98 of FIG. 1. The updating gating signal allows the fast integrators to discharge into the output integrators so that the fast integrators are now ready to accept new tracking information. It may be observed from the update gating signal waveform 21 of FIG. 2 that the integrators are updated between horizontal active scan periods (waveform 23, FIG. 2) so as not to interfere with the data acquisition rate of the system. The signal from the fast integrators is transferred as an incremental current to the output integrators whose stored value represents the gate's center position as of the last sampling interval. This gate position is fed back to the gate generating circuit and also to the other circuits that require the position of the center of the gates.

It should be noted that in the circuits shown in FIGS. 5 and 6 that the positions of the leading and trailing edges of the tracking gates are controlled as a function of the gate width voltage and therefore the width or time duration of the tracking gates is controlled by the gate width voltage. This feature, of having the width of the tracking gates automatically controlled, is a very important aspect of the improved performance of the system of the subject invention. It will be recalled, relative to the discussion of the circuitry of FIG. 8, that the output signal of the integrator 208 is representative of the linear dimension of the designated target image. This voltage is subtracted from the previously derived gate width voltage and any difference therebetween is gated through the gate 216 to update the gate width voltage integrator 217 so that the size of the tracking gates are maintained slightly larger than the size of the target being tracked. Also, it will be recalled from the discussion of the circuits relative to FIG. 8 that by operation of ganged switches 212 and 219 the operator may manually control the magnitude of the gate width voltage and therefore the size of the tracking gates. Also, it is important to note that the circuitry, including the comparator 221 and the gate 218, senses when the signal from integrator 208 represents a target area that is smaller than a predetermined target size and increases the size of the tracking gates until the target image size sensed at the output of the integrator 208, is above the minimum predetermined value. The function performed by this circuit is important if due to a sudden transitory change in the image size of the target, the target image exceeds the size of the tracking gates causing the operation of the background referenced video processor to temporarily become unreliable. In the just described circumstance, it is possible that no digital target signals will be generated resulting in an unreliable tracking condition. However, in the system of the subject invention this momentary problem is sensed, by the circuitry including the comparator 221, as a smaller than practical target image size and the gate 218 is actuated to increase the tracking gate size until the tracking gate is larger than the target at which time the gate 218 is closed.

The voltage $P_h$ at the output terminal of the horizontal integrator 104, is applied to a signal input terminal of the azimuth servo unit 18; which unit in response thereto positions the horizontal center of the raster (designated 42 on the screen 40 of FIG. 1) into coincidence with the center of the designated target (indicated by the numeral 52 of FIG. 1). In a similar manner, the output signal of the vertical integrator 100, $P_v$, is applied to a signal input terminal of the elevation servo 24 and in response to the signal $P_v$ the elevation servo positions the center of the elevation scan such that it is coincident with the center of the designated target. However, for applications involving high tracking rates the servo units may be limited by stability criteria so that they cannot instantaneously center the scanned raster on the target. To compensate for the just stated situation the armament control computer 106 receives the signals $AZ_p$ and $EL_p$, representative of the location of the center of the scan raster (point 42 of FIG. 1); as well as the signals $P_h$ and $P_v$ displacement which are representative of the displacement of the center of the target from the center of the raster. Using this information, the armament control computer, as is well-known in the art, computes the line of sight position of the target as well as the line of sight rate of the target relative to the armament reference line of a weapon launch system (not shown) so as to intercept the designated target.

Thus there has been described an infrared automatic tracking system which provides signals in rectangular coordinates proportional to the angular deviation of a target's line of sight from the sensor's optical axis. In addition the tracking system of the subject invention provides tracking gates which are automatically adaptable to the size of a designated target image and a tracking integrator mechanism that maintains a substantially constant loop gain independent of the target image size.

What is claimed is:

1. A tracking system for determining the relative location of a designated target comprising:
   sensor means for providing received video signals that are indicative of the intensity of received infrared energy and for providing sensor position signals indicative of the relative position of said sensor means;
   a gated video processor responding to the received video signals for providing digital target signals representative of the image area of targets, said processor having a gate signal input circuit;
   gated video tracking means responding to the target signals for generating target position signals indicative of the relative location of a designated target, said gated video tracking means having a plurality of tracking gate input circuits;
   and gate generating means, responding to said target position signals and to said sensor position signals, for applying a plurality of tracking gate signals to said plurality of tracking gate input circuits and for applying processor gates to said gate signal input circuit of said video processor.

2. The system of claim 1 wherein said sensor means comprises an array of infrared detector elements scanned in an interlaced raster in a first dimension, and said tracking system further comprising updating means coupled to said sensor means and to said gated video tracking means for initiating the updating of the target position signals each selected number of fields of the interlaced raster.

3. The system specified in claim 1 wherein said gated video tracker includes gated area current means for reducing the gain of said tracker as a function of a dimension of a designated target image.

4. The system as specified in claim 1 wherein said gate generating means further includes means, responding to the digital target signals for varying the time duration of said tracking gate signals as a function of the size of the area of the designated target image.

5. The system as specified in claim 1 wherein said gate generating means further includes means reponsive to said digital target signals for automatically increasing the tracking gates size when said gated target image is smaller than a predetermined value.

6. The system as specified in claim 1 wherein:
   said sensing means comprises an array of infrared detector elements;
   and said video processor includes selection means for providing target signals corresponding exclusively to targets either hotter than or colder than the average of the video signals encompassed in the processor gates.

7. A tracking system comprising:
   an array of sensor elements;
   scanning means, coupled to said array of elements, for scanning said array, said scanning means having a scan position output circuit;
   an array multiplexer having an input circuit coupled to said sensor elements and having a received video output circuit;
   a video processor having an input circuit coupled to said received video output circuit and having a target signal output circuit;
   a gated video tracker having a target signal input circuit coupled to said target signal output circuit, having a plurality of gating signal input circuits and having a target position output circuit;
   and a gate generator having a scan position input circuit coupled to said scan position output circuit, having a target position input circuit coupled to said target position output circuit and having a plurality of gating signal output circuits coupled to said gating signal input circuits.

8. The system of claim 7 wherein said gate generator further comprises crosshair signal output circuits and wherein said system further includes a display monitor having an input circuit coupled to said received video output circuit and to said crosshair signal output circuit.

9. The system of claim 7 wherein said video processor is a digital background gated video processor having a background gate input circuit and wherein said gate generator further includes a background gate output circuit coupled to said background gate input circuit.

10. The system of claim 7 further comprising:
    target image size means for providing a current which is an inverse function of the area of the tracking gates circuit said means having a signal input circuit coupled to said target signal output circuit of said video processor, having a gate input circuit coupled to said gating signal output circuit of said gate generator and having a gated area current output circuit;
    and wherein said gated video tracker further includes a gated area current input circuit coupled to said gated area current output circuit of said target image size means.

11. The system of claim 7 further comprising:
    target image size means for providing a voltage proportional to a target image dimension, said means having an input circuit coupled to said target signal output circuit of said video processor, having a gating input circuit coupled to said gating signal output circuit of said gate generator and having a gate width voltage output circuit; and wherein said gate generator further comprises a gate width input circuit coupled to said gate width output circuit.

12. The system of claim 7 further comprising:
a target image size circuit, having an input circuit coupled to said target signal output circuit of said video processor, having a gating input circuit coupled to said gating signal output circuit of said gate generator and having a gate width voltage output circuit for generating a gate width control signal indicative of the target image's dimension; said target image size circuit further comprising means for automatically increasing the magnitude of said gate width control signal when said target image size circuit senses a target image size below a predetermined value;
and wherein said gate generator further comprising a gate width input circuit coupled to said gate width output circuit.

13. The system of claim 7 wherein:
said gated video tracker further includes a gated area current input circuit;
said gate generator further comprises a gate width input circuit;
and said system further includes a target image size circuit having an input circuit coupled to said target signal output circuit of said video tracker, having a gating input circuit coupled to said gating signal output circuit of said gate generator having a gate width voltage output circuit coupled to said gate width input circuit and having a gated area current output circuit coupled to said gated area current input circuit.

14. The system of claim 7 wherein:
said gated video tracker further includes a gated area current input circuit;
said gate generator further comprising a gate width input circuit;
and said system further including a target image size circuit having an input circuit coupled to said target signal output circuit of said video tracker, having a gating input circuit coupled to said gating signal output circuit of said gate generator, having a gate width voltage output circuit coupled to said gate width input circuit for generating a gate width control signal indicative of the target image size, having a gated area current input circuit coupled to said gated area current output circuit, and wherein said target image size circuit further includes means for automatically increasing the magnitude of said gate width control signal when said target image size circuit senses the target image size below a predetermined value.

15. The system of claim 7 wherein:
said gated video tracker further includes a gated area current input circuit;
said gate generator further comprising a gate width input circuit and a background gate output circuit;
said video processor is a digital background gated video processor having a background gate input circuit coupled to said background gate output circuit;
and said system further includes a target image size circuit having an input circuit coupled to said signal output circuit of said video processor, having a gating input circuit coupled to said signal output circuit of said gate generator, having a gate width voltage output circuit coupled to said gate width input circuit and having a gated area current output circuit coupled to said gated area current input circuit.

16. A tracking system for determining the relative location of a designated target comprising:
an array of infrared detectors;
scanning means, coupled to said array, for scanning said array in a first dimension and for interlacing the array scan in a second dimension;
an array multiplexer coupled to said detector for electronically sequentially reading out received video signals from said array detectors;
a background gated video processor having a background gate input circuit and including selection means for providing target signals corresponding exclusively to targets either hotter than or colder than the average value of the video signals encompassed in the background gates;
a gated video tracker, responding to said target signals, for generating target position signals indicative of the location of a designated target, said gated video tracker having a plurality of tracking gate input circuits and including means for decreasing the gain of the tracker as a function of the target image area;
and gate generating means, responding to said target position signals, for providing a plurality of tracking gates to said plurality of gating input circuits and for providing background gates to said background gate input circuit, said gate generator means including means for sensing the size of a designated target and increasing the size of the tracking gate as a function thereof, and said gate generating means further comprising means for sensing when the gated target signal is less than a predetermined value and increasing the gate size of the tracking gate in response thereto.

17. A system as specified in claim 16 wherein said gate generator means further includes a crosshair signal output circuit, and said system further comprising a display monitor having an input circuit coupled to said received video output circuit and to said crosshair output circuit.

18. A system as specified in claim 16 wherein said gated video tracker comprises a selector having first and second positions whereby when said selector is in the first position the output of said tracker is indicative of the relative position of a designated target and wherein said selection means is in said second position the output of the gated video tracker is manually controllable.

* * * * *